United States Patent Office 3,716,510
Patented Feb. 13, 1973

3,716,510
SEALANT COMPOSITION
Steven G. Belak, Claymont, Del., and Lewis W. Hall, Jr., Chadds Ford, Pa., assignors to Standard Oil Company, Chicago, Ill.
No Drawing. Filed Jan. 2, 1968, Ser. No. 694,835
Int. Cl. C08f 45/52
U.S. Cl. 260—28.5 AS 3 Claims

ABSTRACT OF THE DISCLOSURE

A sealant composition suitable for heat sealing electrical conduits yet does not form a permanent bond without heat sealing, is made from about 65 to 85 weight percent of atactic polypropylene or atactic propylene-ethylene copolymer, 5 to 15 weight percent of carbon black, 5 to 10 weight percent of asphalt and 5 to 20 weight percent of petroleum mineral oil.

BACKGROUND OF THE INVENTION

This invention relates to sealant formulations for use in conjunction with heat shrinkable sleeves, for example, in the fabrication of underground electrical connections.

For applications in which a space is to be filled with sealant, a material is desired that can be pressed or extruded into strips for storage and handling. For example, in the case of the underground electrical connections, it would be desirable to wrap the electrical wire with the strip sealant at the junction of the sleeves, so that upon heating the sealant will melt and flow and subsequently will cool to form a water impervious seal.

In the past sealants used for this purpose have generally been tacky under normal conditions of handling and storage, which has necessitated the use of release paper to prevent adhesion of the adhesive to itself or objects which it might contact. The compositions of the present invention range from essentially non-tacky to slightly tacky materials. Those that are somewhat tacky can be covered with a non-fibrous material such as polyethylene or polypropylene fiber, aluminum foil or the like. Although the tacky compositions of the invention may stick, it is not a permanent seal until melted and the sealant can be easily removed for use.

The sealant of the invention works exceptionally well with plastic conduits such as that extruded from polyethylene, polyvinylchloride, polypropylene, and the like. It is also suitable for use with other types of materials such as metal or ceramic tubing.

SUMMARY OF THE INVENTION

Briefly stated the present invention is a sealant composition consisting essentially of 65 to 85 weight percent of α-olefinic polymer selected from the group consisting of atactic polypropylene and atactic propylene-ethylene compolymer, 5 to 15 weight percent of carbon black, 5 to 10 weight percent of asphalt and 5 to 20 weight percent of petroleum mineral oil.

DESCRIPTION OF THE INVENTION

The term asphalt as used herein and in the appended claims includes bituminous materials containing asphaltenes or tarry constituents and comprises such bituminous materials as, for example, petroleum, residues, pitches, road oils, albino asphalts, asphalt cutbacks, coal tar pitch; cracked, straight run, vacuum tower residuum, solvent precipitated, air blown or natural asphalts. Suitable asphalts have a penetration (1/10 mm.) of from 60 to 100 at 77° F.

The atactic propylene-ethylene copolymer is a byproduct of the production of crystalline propylene-ethylene sequential block copolymer or propylene-ethylene terminal block copolymer. Such crystalline polymers can be prepared by initially contacting a first feed which can be propylene alone or propylene in admixture with a small quantity of ethylene, in solution in an inert hydrocarbon solvent with a catalyst system consisting of titanium trichloride, a dialkyl aluminum halide, and a glycol ether. After the polymerization has proceeded for a desired length of time, passage of the first feed to the reactor is discontinued, and a second feed, which may be ethylene, or a mixture of ethylene and propylene richer in ethylene than the first feed stream, is passed to the reactor, and polymerization is continued for a second period of time, after which the reaction is stopped by the addition of a polar material, such as an alcohol. Proceeding in this manner, a two-segment block polymer is produced, the first segment of which is polypropylene or a copolymer rich in propylene, and the second segment of which is polyethylene, or a copolymer richer in ethylene than the first segment. Alternately, the two feeds may be alternated two or more times, yielding a polymer having three or more segments of varying ethylene content. Such a process is described in Belgian Pat. No. 538,782.

In carrying out block polymerization, the catalyst components are generally dissolved or suspended in an inert hydrocarbon solvent such as hexane, heptane, or octane, or mixtures thereof, in an appropriate reaction vessel equipped with means to agitate the contents thereof, in the absensce of oxygen or moisture. The catalyst containing solvent is then usually brought to a temperature in the range of 25° C. to 150° C., preferably 60° C. to 80° C., and the olefin or mixture of olefins to be polymerized is then pressured into the reactor. Moderately elevated pressures, as from 20 p.s.i.g. to 500 p.s.i.g. are used in order to increase the amount of olefin dissolved in the solvent, and thus speed the reaction.

The aluminum component of the catalyst system may be any dialkyl aluminum halide, such as diethyl aluminum chloride, dipropyl aluminum chloride, dibutyl aluminum chloride or the corresponding bromine or iodine analogues, as well as dialkyl aluminum halides the ethyl radicals of which contain greater numbers of carbon atoms than those illustrated above. The glycol ether component of the catalyst may be any glycol ether, such as ethylene glycol dimethyl or diethyl ether, and corresponding di-ethers of diethylene glycol, triethylene glycol, or higher glycols.

In one known process for producing crystalline propylene-ethylene copolymers, the atactic (essentially non-crystalline) propylene-ethylene copolymer is formed during the stereo specific polymerization of propylene and ethylene. The atactic propylene-ethylene copolymer usually represents from about 5 to 15 weight percent of the polymerization product, the remainder by an essentially crystalline propylene-ethylene copolymer. The polymer product is contacted with a solvent consisting of methanol and water to kill the catalyst. The catalyst is then removed in solution leaving a heptane slurry. The atactic propylene-ethylene copolymer is in solution in the heptane and this solution is removed from the substantially crystalline propylene-ethylene copolymer. The solution is distilled to recover the heptane solvent which is recycled. The solid material which remains is the atactic propylene-ethylene copolymer employed in the compositions of this invention. The solid atactic propylene-ethylene copolymers suitable for the compositions of the invention have a molecular weight in the range of 5,000 to 100,000 and a Brookfield melt viscosity in the range of 20,000 to 100,000 centipoises at 300° F. The atactic propylene-ethylene copolymer is soluble in boiling pentane, hexane, heptane, and other hydrocarbons. The atactic propylene-ethylene copolymers employed in the present invention are predominantly polypropylene with small amounts of ethylene 0.5 to 20 weight percent in the propylene polymer chain. The present copolymers are readily distinguished from amorphous ethylene-propylene copolymers which usually have high polyethylene content. The atactic propylene-ethylene copolymer is essentially amorphous copolymer with minor amounts of stereoblock copolymer and substantially crystalline copolymer.

Atactic polymers of the type employed herein are further characterized in La Chemia e F'Industria 39, No. 4, pages 275-283 (1957) and Journal of Applied Polymer Science, vol. IV, No. 11, pages 219-224 (1960).

The atactic (essentially non-crystalline) polypropylene is formed during the stereospecific polymerization of propylene. The polymerization takes place in the presence of a catalyst comprising a coordination complex of a transition metal halide with an organometallic compound. The atactic polymerization product, the remainder being substantially crystalline polypropylene. The solid atactic polypropylene suitable of the composition of the invention has a molecular weight of 15,000 to 60,000 and more particularly from 16,000 to 20,000. It is soluble in boiling pentane, hexane, heptane and other hydrocarbons.

In one known process, the polymerization product in the reaction medium is contracted with a solvent consisting of methanol and water to kill the catalyst. The catalyst is then removed in solution leaving a heptane slurry. The atactic polypropylene is in solution in the heptane, and this solution is removed from the substantially crystalline polymer. The solution is distilled to recover the heptane solvent which is recycled. The solid material which remains is the atactic polypropylene employed in the compositions of this invention. Suitable atactic polypropylene is available commercially, such as "Oletac 10" produced by Avisun Corporation.

Suitable petroleum mineral oils include aromatic, naphthenic and paraffinic oils containing from 0 to 100% aromatics and having a Saybolt Universal viscosity of 210° F. in the range of from 30 to 210 seconds and a flash point (COC) of at least 350° F.

The carbon black employed can be any of those available such as channel blacks, gas furnace blacks, thermal blacks, oil furnace blacks and the like in any of the grades such as, fine or coarse, hard or soft.

The compositions are prepared by blending the ingredients at a temperature of 200 to 500° F. until the mixture is homogeneous. Generally the $\alpha$-olefinic polymer is blended with the carbon black and asphalt to a homogeneous mixture and the petroleum oil added last and blending continued until the mixture is again homogeneous. A suitable blender is a Baker-Perkins mixer. The mixing can be carried out in any suitable manner. Any type of equipment which is suitable for blending viscous mixtures at the temperatures indicated can be employed or the temperatures themselves can vary somewhat as well as the order of components so long as a homogeneous mixture is the final product.

The composition can then be poured or extruded into sheets for use. To use the sealant it is wrapped around the electrical wire at the point where the connection of two sleeves is to be made. Enough sealant is used so that it is packed against the joint. When the joint is heated the sealant is sufficiently softened so that it flows into and around the joint. When the joint has cooled, a permanent water tight joint is formed.

The following examples illustrate the invention and are not intended to determine or limit its scope.

EXAMPLE 1

74.3 weight percent of an atactic propylene-ethylene terminal block copolymer, 8.2 weight percent of carbon black, 6.6 weight percent of asphalt and 10.9 weight percent of petroleum mineral oil.

The asphalt employed has the following properties:

TABLE 1

Asphalt

| | |
|---|---|
| R & B softening point, ° F. | 105-120. |
| Penetration at 77° F. (1/10 mm.) | 70-90. |
| Penetration at 32° F. (1/10 mm.) | 15-20. |
| Flash (COC) | 575° F. min. |
| Flash (SPM) | 475° F. min. |
| Furol viscosity at 210° F. | 1200-1700. |
| Specific gravity at 60° F. | 1015-1030. |

The atactic propylene-ethylene copolymer employed had a molecular weight (No. average molecular weight) of about 27,000 and a Brookfield viscosity of about 23,500 centipoise at 300° F.

The petroleum mineral oil employed had the properties set out in Table 2.

TABLE 2

| | |
|---|---|
| Viscosity, SUS at 100° F. | 15,000 |
| Viscosity, SUS at 210° F. | 176 |
| API gravity at 60° F. | 11.8 |
| Specific gravity at 60° F. | 0.987 |
| Flash (COC), ° F. | 470 |
| Fire point, ° F. | 540 |
| Molecular weight | 415 |
| Aniline point, ° F. | 123 |
| Aromatics | [1] 81.5 |

[1] Weight percent.

The carbon black used in the example was Furnex SRF Carbon Black which is a semi-reinforcing furnace carbon black of Columbian Carbon Company.

The sealant composition is molded into a sheet and cut into strips of about 30 mil thickness having dimensions of about 6 inches x 2 inches. The composition had the following properties:

| | |
|---|---|
| Ring and Ball softening point, ° F. | 317-319 |
| Specific gravity at 74° F. | 0.92 |
| Flow on a 45° incline plant at 100° C. for 2 weeks | 0 |

A strip of the sealant is forced in a crosslinked polyethylene heat shrinkable sleeve joining the crosslinked polyethylene tubes. The sleeve is heated at about 400° F. for 5 minutes. After cooling the sealant is examined and found to be permanently bonded to the joint thus forming a thermoplastic water impervious seal.

We claim:

1. A sealant composition consisting essentially of 65 to 85 weight percent of an $\alpha$-olefinic polymer selected from the group consisting of atactic polypropylene and atactic propylene-ethylene copolymer, said atactic propylene-ethylene copolymer being predominantly propylene, 5 to 15 weight percent of carbon black, 5 to 10 weight percent of asphalt and 5 to 20 weight percent of petroleum mineral oil, the total weight percent of the sealant composition not exceeding 100, said composition being heat-sealable but having insufficient tack to form a permanent bond to itself or another material except when heat-sealed.

2. The sealant composition of claim 1 wherein the ethylene content of the atactic propylene-ethylene copolymer is in the range of from about 0.5 to about 20 weight percent based on the weight of the atactic propylene-ethylene copolymer.

3. The sealant composition of claim 2 wherein the $\alpha$-olefinic polymer is present in an amount of about 75 weight percent, the carbon black is present in an amount of about 8 weight percent, the asphalt is present in an amount of about 7 weight percent and the petroleum mineral oil is present in an amount of about 10 weight percent, the total weight percent of the sealant composition not exceeding 100.

References Cited

UNITED STATES PATENTS

| | | | |
|---|---|---|---|
| 2,728,734 | 12/1955 | Cubberley | 260—28.5 AS |
| 3,144,424 | 8/1964 | Clelland | 260—28.5 AS |
| 3,303,151 | 2/1967 | Peters | 260—28.5 AS |
| 3,312,157 | 4/1967 | Coscia | 260—28.5 AS |
| 3,459,695 | 8/1969 | Hedge | 260—28.5 AS |

OTHER REFERENCES

A. Damusis: "Sealants," Reinhold Pub., October 1967, pp. 52–53.

MORRIS LIEBMAN, Primary Examiner

P. R. MICHL, Assistant Examiner